US012625725B2

(12) United States Patent
Santan et al.

(10) Patent No.: US 12,625,725 B2
(45) Date of Patent: May 12, 2026

(54) DYNAMIC PROVISIONING OF PORTIONS OF A DATA PROCESSING ARRAY FOR SPATIAL AND TEMPORAL SHARING

(71) Applicant: Xilinx, Inc., San Jose, CA (US)

(72) Inventors: Sonal Santan, San Jose, CA (US); Yu Liu, Newark, CA (US); Akila Subramaniam, Allen, TX (US); Vinod K. Kathail, Palo Alto, CA (US); King Chiu Tam, Vaughan (CA); Tung Chuen Kwong, Richmond Hill (CA); Pranjal Joshi, San Jose, CA (US); Soren T. Soe, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 570 days.

(21) Appl. No.: 18/145,662

(22) Filed: Dec. 22, 2022

(65) Prior Publication Data

US 2024/0211302 A1 Jun. 27, 2024

(51) Int. Cl.
*G06F 9/48* (2006.01)
*G06F 9/50* (2006.01)

(52) U.S. Cl.
CPC ............. *G06F 9/4843* (2013.01); *G06F 9/48* (2013.01); *G06F 9/4806* (2013.01); *G06F 9/485* (2013.01); *G06F 9/4856* (2013.01); *G06F 9/4862* (2013.01); *G06F 9/4881* (2013.01); *G06F 9/50* (2013.01); *G06F 9/5005* (2013.01); *G06F 9/5061* (2013.01); *G06F 9/5077* (2013.01)

(58) Field of Classification Search
CPC ........ G06F 9/48; G06F 9/4806; G06F 9/4843;

G06F 9/485; G06F 9/4856; G06F 9/4862; G06F 9/4881; G06F 9/50; G06F 9/5005; G06F 9/5061; G06F 9/5077
See application file for complete search history.

(56) References Cited

U.S. PATENT DOCUMENTS

| | | | |
|---|---|---|---|
| 3,776,137 A | 12/1973 | Abbott | |
| 4,876,641 A | 10/1989 | Cowley | |
| 6,091,263 A | 7/2000 | New et al. | |
| 6,150,839 A | 11/2000 | New et al. | |
| 6,204,687 B1 | 3/2001 | Schultz et al. | |
| 6,462,579 B1 | 10/2002 | Camilleri et al. | |

(Continued)

OTHER PUBLICATIONS

Li et al, "A Survey: FPGA-Based Dynamic Scheduling of Hardware Tasks", Chinese Journal of Electronics, vol. 30, Nov. 6, 2021 (pp. 991-1007) (Year: 2021).*

*Primary Examiner* — Charles M Swift

(74) *Attorney, Agent, or Firm* — Kevin T. Cuenot

(57) ABSTRACT

Dynamic provisioning of portions of a data processing array includes receiving, from an executing application, a context request. The context request specifies a requested task to be performed by a data processing array. A configuration for the data processing array is selected from a plurality of configurations for the data processing array. The selected configuration conforms with the context request and is capable of performing the requested task. A determination is made whether the selected configuration is implementable in the data processing array based, at least in part, on a space requirement of the selected configuration and a current status of the data processing array. The selected configuration is selectively implemented in the data processing array based on the determination.

17 Claims, 9 Drawing Sheets

500

Receive, from an executing application, a context request, wherein the context request specifies a requested task to be performed by a data processing array
502

↓

Select, from a plurality of configurations for the data processing array, a selected configuration that conforms with the context request and that is capable of performing the requested task
504

↓

Determine whether the selected configuration is implementable in the data processing array based, at least in part, on a space requirement of the selected configuration and a current status of the data processing array
506

↓

Selectively implement the selected configuration in the data processing array based on the determining.
508

(56) References Cited

U.S. PATENT DOCUMENTS

| | | | |
|---|---|---|---|
| 6,526,557 | B1 | 2/2003 | Young et al. |
| 6,759,869 | B1 | 7/2004 | Young et al. |
| 6,781,407 | B2 | 8/2004 | Schultz |
| 6,810,514 | B1 | 10/2004 | Alfke et al. |
| 6,836,842 | B1 | 12/2004 | Guccione et al. |
| 6,907,595 | B2 | 6/2005 | Curd et al. |
| 7,024,651 | B1 | 4/2006 | Camilleri et al. |
| 7,057,413 | B1 | 6/2006 | Young et al. |
| 7,124,338 | B1 | 10/2006 | Mark et al. |
| 7,185,309 | B1 | 2/2007 | Kulkarni et al. |
| 7,199,608 | B1 | 4/2007 | Trimberger |
| 7,224,184 | B1 | 5/2007 | Levi et al. |
| 7,281,093 | B1 | 10/2007 | Kulkarni et al. |
| 7,301,822 | B1 | 11/2007 | Walstrum, Jr. et al. |
| 7,302,625 | B1 | 11/2007 | Payakapan et al. |
| 7,328,335 | B1 | 2/2008 | Sundararajan et al. |
| 7,380,035 | B1 | 5/2008 | Donlin |
| 7,394,288 | B1 | 7/2008 | Agarwal |
| 7,420,392 | B2 | 9/2008 | Schultz et al. |
| 7,454,658 | B1 | 11/2008 | Baxter |
| 7,477,072 | B1 | 1/2009 | Kao et al. |
| 7,478,357 | B1 | 1/2009 | Mason et al. |
| 7,482,836 | B2 | 1/2009 | Levi et al. |
| 7,500,060 | B1 | 3/2009 | Anderson et al. |
| 7,509,617 | B1 | 3/2009 | Young et al. |
| 7,518,396 | B1 | 4/2009 | Kondapalli et al. |
| 7,521,961 | B1 | 4/2009 | Anderson |
| 7,539,845 | B1 | 5/2009 | Wentzlaff et al. |
| 7,546,572 | B1 | 6/2009 | Ballagh et al. |
| 7,574,680 | B1 | 8/2009 | Kulkarni et al. |
| 7,576,561 | B1 | 8/2009 | Huang |
| 7,619,442 | B1 | 11/2009 | Mason et al. |
| 7,640,527 | B1 | 12/2009 | Dorairaj et al. |
| 7,650,248 | B1 | 1/2010 | Baxter |
| 7,653,820 | B1 | 1/2010 | Trimberger |
| 7,689,726 | B1 | 3/2010 | Sundararajan et al. |
| 7,724,815 | B1 | 5/2010 | Raha et al. |
| 7,746,099 | B1 | 6/2010 | Chan et al. |
| 7,774,579 | B1 | 8/2010 | Wentzlaff |
| 7,788,625 | B1 | 8/2010 | Donlin et al. |
| 7,831,801 | B1 | 11/2010 | Anderson |
| 8,006,021 | B1 | 8/2011 | Li et al. |
| 8,020,163 | B2 | 9/2011 | Nollet et al. |
| 8,045,546 | B1 | 10/2011 | Bao et al. |
| 8,102,188 | B1 | 1/2012 | Chan et al. |
| 8,214,694 | B1 | 7/2012 | Mckechnie et al. |
| 8,250,342 | B1 | 8/2012 | Kostamov et al. |
| 8,359,448 | B1 | 1/2013 | Neuendorffer |
| 8,415,974 | B1 | 4/2013 | Lysaght |
| 8,656,141 | B1 | 2/2014 | Agarwal |
| 8,719,750 | B1 | 5/2014 | Balzli, Jr. |
| 8,796,539 | B2 | 8/2014 | Asaumi et al. |
| 8,928,351 | B1 | 1/2015 | Konduru |
| 9,081,634 | B1 | 7/2015 | Simkins et al. |
| 9,152,794 | B1 | 10/2015 | Sanders et al. |
| 9,165,143 | B1 | 10/2015 | Sanders et al. |
| 9,218,443 | B1 | 12/2015 | Styles et al. |
| 9,230,112 | B1 | 1/2016 | Peterson et al. |
| 9,323,876 | B1 | 4/2016 | Lysaght et al. |
| 9,336,010 | B2 | 5/2016 | Kochar et al. |
| 9,411,688 | B1 | 8/2016 | Poolla et al. |
| 9,436,785 | B1 | 9/2016 | Javre |
| 9,639,487 | B1 | 5/2017 | Wentzlaff |
| 9,652,252 | B1 | 5/2017 | Kochar et al. |
| 9,652,410 | B1 | 5/2017 | Schelle et al. |
| 9,722,613 | B1 | 8/2017 | Schultz et al. |
| 9,990,241 | B2 | 6/2018 | Dobbs |
| 10,243,882 | B1 | 3/2019 | Swarbrick |
| 10,505,548 | B1 | 12/2019 | Swarbrick |
| 10,673,439 | B1 | 6/2020 | Ahmad |
| 10,747,690 | B2 | 8/2020 | Bilski |
| 10,824,505 | B1 | 11/2020 | Swarbrick |
| 10,824,584 | B1 | 11/2020 | Noguera Serra |
| 10,838,908 | B2 | 11/2020 | Swarbrick |
| 10,866,753 | B2 | 12/2020 | Noguera Serra |
| 10,963,421 | B1 | 3/2021 | Swarbrick |
| 2004/0114609 | A1 | 6/2004 | Swarbrick et al. |
| 2004/0210695 | A1 | 10/2004 | Weber et al. |
| 2007/0006137 | A1 | 1/2007 | Savagaonkar |
| 2007/0124565 | A1 | 5/2007 | Jones |
| 2008/0082759 | A1 | 4/2008 | Pong |
| 2008/0320255 | A1 | 12/2008 | Wingard et al. |
| 2008/0320268 | A1 | 12/2008 | Wingard et al. |
| 2012/0036296 | A1 | 2/2012 | Wingard et al. |
| 2012/0310983 | A1 | 12/2012 | Mittal |
| 2014/0006751 | A1 | 1/2014 | Aliseychik et al. |
| 2014/0267334 | A1 | 9/2014 | Duluk, Jr. |
| 2016/0011996 | A1 | 1/2016 | Asaad et al. |
| 2017/0140800 | A1 | 5/2017 | Wingard et al. |
| 2017/0195173 | A1* | 7/2017 | Izenberg .............. G06F 9/5044 |
| 2017/0220499 | A1 | 8/2017 | Gray |
| 2017/0315944 | A1 | 11/2017 | Mayer et al. |
| 2018/0012637 | A1 | 1/2018 | Krishna |
| 2018/0219797 | A1* | 8/2018 | Sen ......................... H04L 67/34 |
| 2019/0155666 | A1 | 5/2019 | Dobbs |
| 2019/0205263 | A1 | 7/2019 | Fleming |
| 2019/0205269 | A1 | 7/2019 | Fleming, Jr. |
| 2019/0213029 | A1* | 7/2019 | Liu ..................... G06F 9/45558 |
| 2019/0238453 | A1 | 8/2019 | Swarbrick et al. |
| 2019/0266125 | A1 | 8/2019 | Swarbrick et al. |
| 2019/0303033 | A1 | 10/2019 | Noguera Serra et al. |
| 2019/0303311 | A1 | 10/2019 | Bilski et al. |
| 2019/0303323 | A1 | 10/2019 | Swarbrick et al. |
| 2019/0303328 | A1 | 10/2019 | Bilski et al. |
| 2020/0026575 | A1* | 1/2020 | Guim Bernat ........ G06F 21/602 |
| 2020/0174838 | A1* | 6/2020 | Li ........................... G06F 9/505 |
| 2021/0216484 | A1* | 7/2021 | Kamath ................. H04L 12/02 |

* cited by examiner

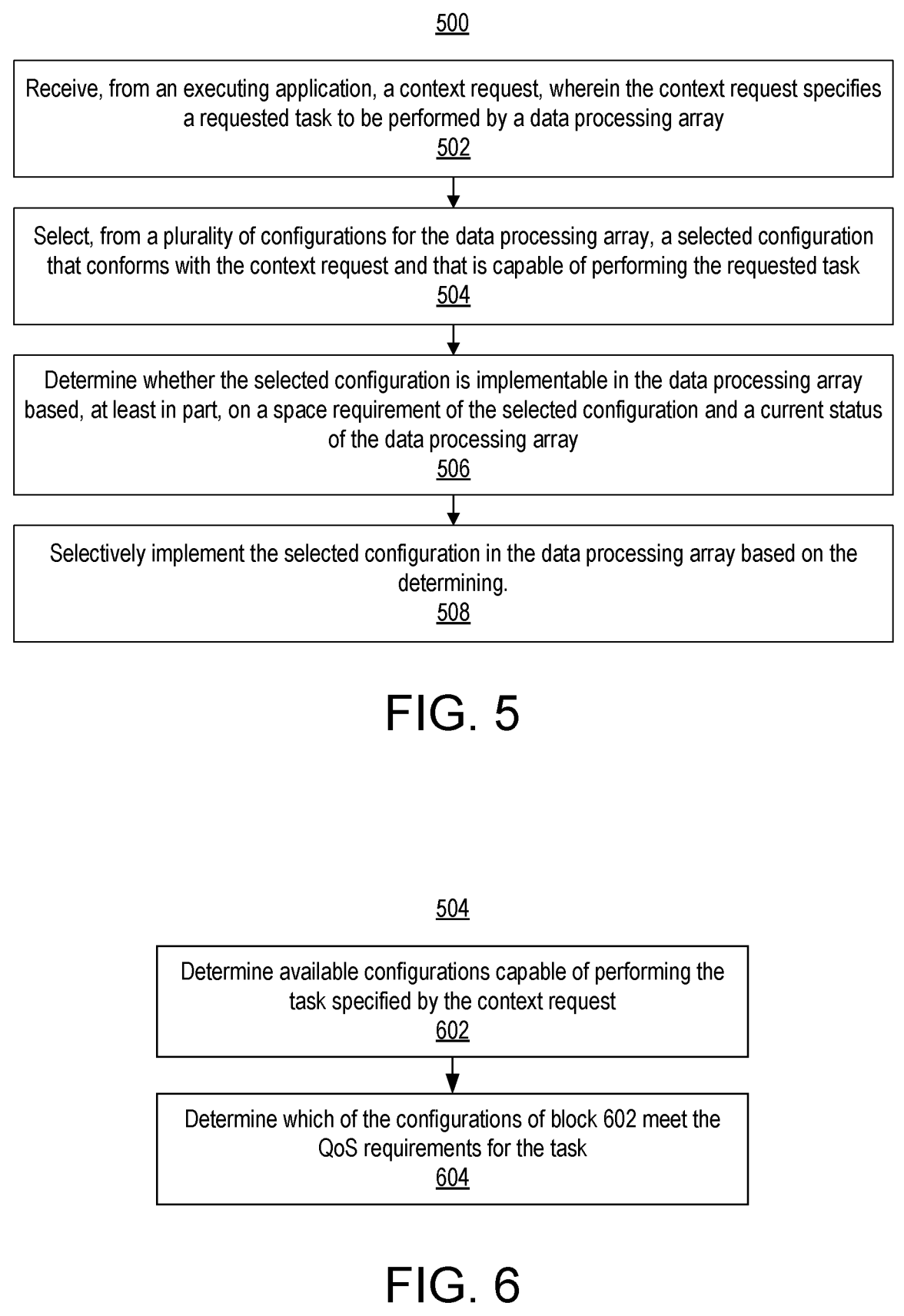

500

| Receive, from an executing application, a context request, wherein the context request specifies a requested task to be performed by a data processing array<br>502 |
| --- |

↓

| Select, from a plurality of configurations for the data processing array, a selected configuration that conforms with the context request and that is capable of performing the requested task<br>504 |
| --- |

↓

| Determine whether the selected configuration is implementable in the data processing array based, at least in part, on a space requirement of the selected configuration and a current status of the data processing array<br>506 |
| --- |

↓

| Selectively implement the selected configuration in the data processing array based on the determining.<br>508 |
| --- |

| Determine available configurations capable of performing the task specified by the context request<br>602 |
| --- |

↓

| Determine which of the configurations of block 602 meet the QoS requirements for the task<br>604 |
| --- |

FIG. 6

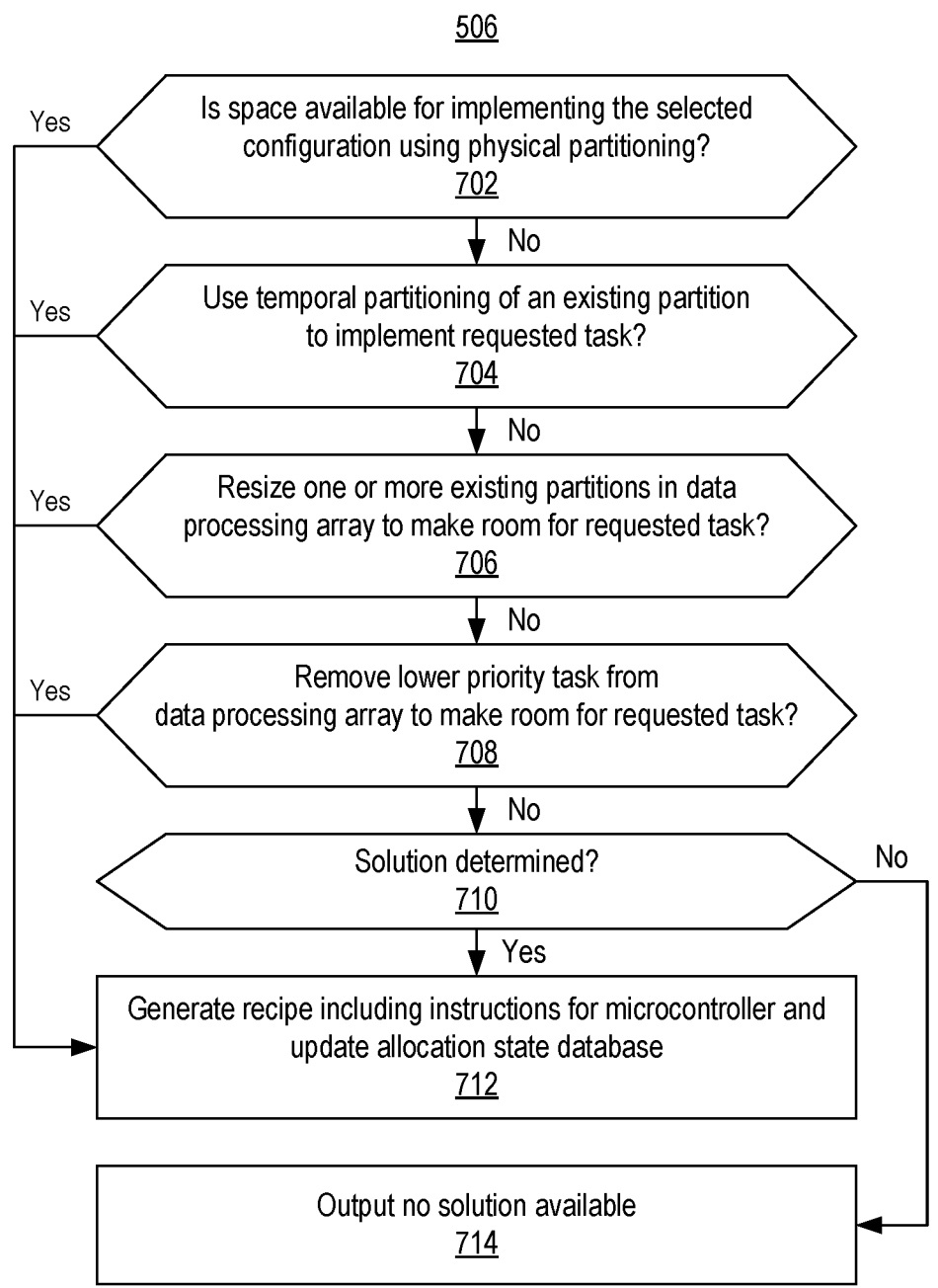

506

Yes — Is space available for implementing the selected configuration using physical partitioning?
702

No

Yes — Use temporal partitioning of an existing partition to implement requested task?
704

No

Yes — Resize one or more existing partitions in data processing array to make room for requested task?
706

No

Yes — Remove lower priority task from data processing array to make room for requested task?
708

No

Solution determined?
710

No

Yes

Generate recipe including instructions for microcontroller and update allocation state database
712

Output no solution available
714

DYNAMIC PROVISIONING OF PORTIONS OF A DATA PROCESSING ARRAY FOR SPATIAL AND TEMPORAL SHARING

TECHNICAL FIELD

This disclosure relates to dynamically sharing portions of a data processing array and, more particularly, to spatially and/or temporally sharing portions of the data processing array.

BACKGROUND

Integrated circuits (ICs) have evolved over time to provide increasingly sophisticated computing architectures. While some ICs utilize computing architectures that include a single processor, others include multiple processors. Still, other ICs include multiple processors arranged in an array. Such ICs are capable of providing significant computational power and a high degree of parallelism that extends well beyond the capabilities of single-processor architectures and even multi-core processor architectures.

While a data processing array is capable of providing significant computational power, effectively managing the data processing array to realize this potential is a complex endeavor. This is particularly true in cases where the data processing array is used to hardware accelerate particular tasks offloaded from a host processor to perform workloads. Reliable mechanisms for managing the offloaded tasks are needed to ensure that the data processing array operates at a high level of computational efficiency.

SUMMARY

In one or more example implementations, a method includes receiving, from an executing application, a context request. The context request specifies a requested task to be performed by a data processing array. The method includes selecting, from a plurality of configurations for the data processing array, a configuration that conforms with the context request and that is capable of performing the requested task. The method includes determining whether the selected configuration is implementable in the data processing array based, at least in part, on a space requirement of the selected configuration and a current status of the data processing array. The method includes selectively implementing the selected configuration in the data processing array based on the determining.

The foregoing and other implementations can each optionally include one or more of the following features, alone or in combination. Some example implementations include all the following features in combination.

In some aspects, the method includes tracking the current status of the data processing array. The current status indicates each configuration running in the data processing array and a partition of the data processing array in which each configuration is running.

In some aspects, the context request specifies a Quality of Service (QoS) requirement for the requested task. The selecting selects a configuration capable of performing the requested task that meets the QoS requirement of the context request.

In some aspects, the method includes, in response to determining that the selected configuration is implementable in the data processing array, determining whether to implement the selected configuration using temporal sharing or location sharing.

In some aspects, determining whether the selected configuration is implementable in the data processing array includes determining whether the data processing array has sufficient unused space in which to run the selected configuration.

In some aspects, the method includes, in response to determining that the data processing array does not have sufficient space to run the selected configuration, terminating operation of an existing configuration running in a selected partition of the data processing array, and running the selected configuration in the selected partition of the data processing array.

In some aspects, the selected configuration has a higher priority than the existing configuration.

In some aspects, the existing configuration is moved to a different partition of the data processing array and run in the different partition.

In some aspects, in response to determining that the data processing array does not have sufficient space to run the selected configuration, the method includes, for an existing configuration running in the data processing array that performs a particular task, selecting a different configuration that performs the particular task and that requires less space in the data processing array than the existing configuration. The method includes running the different configuration in the data processing array. The method includes running the selected configuration in a portion of the data processing array that becomes available from running the different configuration.

In some aspects, the method includes, for a partition implementing a configuration that processes independent workloads, performing a first workload, clearing data memories of the partition, and performing a second and different workload.

In one or more example implementations, a system includes one or more hardware processors configured and/or programmed to initiate operations as described within this disclosure.

In one or more example implementations, a computer program product includes one or more computer readable storage mediums having program instructions embodied therewith. The program instructions are executable by computer hardware, e.g., a hardware processor, to cause the computer hardware to initiate and/or execute operations as described within this disclosure.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 5 illustrates an example method of dynamic provisioning of a data processing array for spatial and/or temporal sharing.

FIG. 6 illustrates an example implementation of block 504 of FIG. 5.

FIG. 7 illustrates an example implementation of block 506 of FIG. 5.

DETAILED DESCRIPTION

Figure 1:
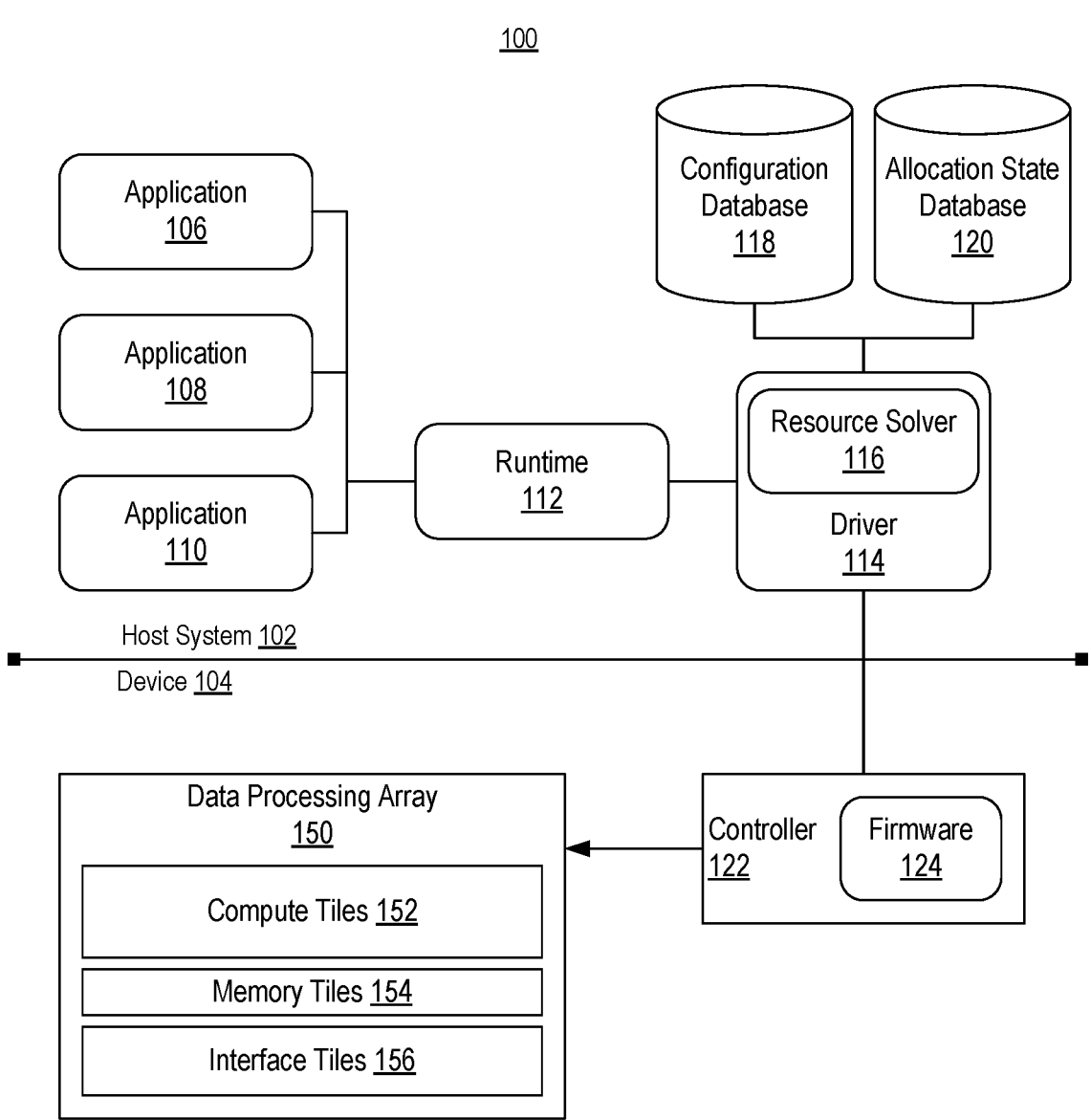
FIG. 1 illustrates an example computing environment including a host system and a device having a data processing array.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to dynamically sharing portions of a data processing array and, more particularly, to spatially and/or temporally sharing portions of the data processing array. In accordance with the inventive arrangements described within this disclosure, methods, systems, and computer program products are provided that are capable of spatially and temporally sharing a data processing array to perform multiple workloads in a secure and scalable manner.

Spatially sharing the data processing array refers to creating distinct and independent regions of the data processing array called partitions. Each partition is capable of running a different configuration isolated from each other partition and independently of each other partition. The configurations can run concurrently. Temporally sharing the data processing array refers to running two or more different configurations in a same partition wherein the configurations are run sequentially (e.g., serially) one at a time. Still, each configuration, when run, runs in an isolated manner independently of each other configuration that shares the same partition. Further, each configuration runs in an isolated manner independently of each other partition.

In one aspect, the data processing array is capable of running two or more configurations using spatial sharing. In another aspect, the data processing array is capable of running two or more configurations using temporal sharing. In still another aspect, the data processing array is capable of running one or more configurations using spatial sharing in which each such configuration runs in its own partition while concurrently with running other configurations using temporal sharing. Thus, the temporally shared configurations share access to a given partition concurrently with the one or more configurations run in one or more different partitions using spatial sharing.

The inventive arrangements further support dynamically provisioning portions, e.g., partitions, of the data processing array to perform spatial and/or temporal sharing of the data processing array as needed and "on the fly." This allows a host processor to offload tasks in an on-demand basis in response to requests from executing applications in a manner that is transparent to the applications. That is, the applications need not have any awareness or knowledge of where within the data processing array requested tasks are being performed so long as particular requirements are met.

Further aspects of the inventive arrangements are described below with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example computing environment 100 including a host system 102 and a device 104. For purposes of illustration, FIG. 1 shows a mixture of hardware components and software components. For example, the various components of host system 102 represent a software architecture that is executable by a hardware processor. An example hardware implementation of computing environment 100 is described in connection with FIG. 8.

In the example, host system 102 is capable of executing one or more applications shown as application 106, application 108, and application 110. Host system 102 also executes a runtime 112. Runtime 112 is capable of interfacing between applications 106, 108, and 110 and device 104. Runtime 112, for example, may be configured to perform one or more device management functions. In the example, runtime 112 communicates with a driver 114. Driver 114 is capable of communicating over a communication channel with device 104 and, more particularly, with controller 122. In the example, driver 114 may include another software component called resource solver 116. Resource solver 116 is capable of accessing a configuration database 118 that stores a plurality of configurations for a data processing array and an allocation state database 120 that stores a state of the data processing array.

Device 104 includes controller 122 and a data processing array 150. Controller 122 is capable of executing firmware 124. Controller 122, in executing firmware 124, is capable of communication with driver 114 of host system 102. Further, controller 122 is capable of receiving instructions from driver 114 and, in response to the received instructions, control operation of data processing array 150. As illustrated, data processing array includes a plurality of compute tiles 152, optionally one or more memory tiles 154, and a plurality of interface tiles 156.

In the example, driver 114 and, more particularly, resource solver 116, is capable of receiving, from an executing application, a context request (not shown). The context request specifies a requested task to be performed by data processing array 150. Resource solver 116 is capable of selecting, from a plurality of configurations for data processing array 150 stored in configuration database 118, a selected configuration that conforms with the context request and that is capable of performing the requested task. Resource solver 116 is capable of determining whether the selected configuration is implementable in data processing array 150 based, at least in part, on a space requirement of the selected configuration and a current status of data processing array 150 as determined from allocation state database 120. Resource solver 116 is capable of selectively implementing the selected configuration in data processing array 150 based on any determinations made.

Figure 2:
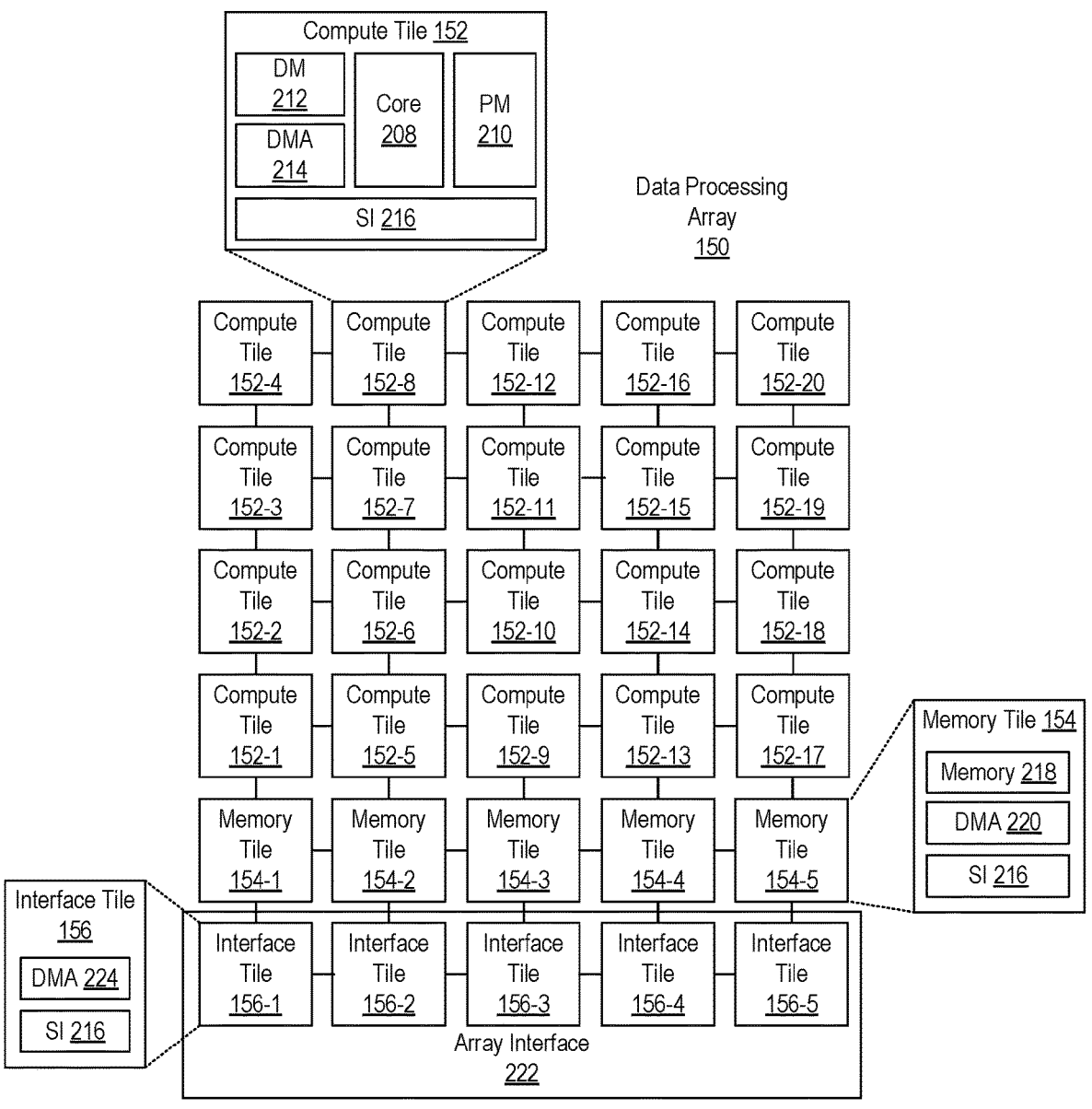
FIG. 2 illustrates an example implementation of the data processing array of FIG. 1.

FIG. 2 illustrates an example implementation of data processing array 150. Data processing array 150, as illustrated in FIG. 1, is disposed in device 104. Device 104 may be implemented as any of a variety of different types of integrated circuits (ICs). For example, device 104 may be implemented in an Application Specific IC (ASIC), as a System-on-Chip (SoC), as a programmable IC that includes programmable circuitry. Programmable logic is an example of programmable circuitry. In one aspect, device 104 may be implemented as a field programmable gate array (FPGA). The IC implementation of device 104 may include a single die or a plurality of interconnected dies, e.g., disposed in a same IC package.

Data processing array 150 may be implemented as a plurality of interconnected tiles. The term "tile," as used herein in connection with a data processing array, means a circuit block. The interconnected tiles of data processing array 150 include compute tiles 152, interface tiles 156, and memory tiles 154. The tiles illustrated in FIG. 2 may be arranged in an array or grid and are hardwired.

Each compute tile 152 can include one or more cores 208, a program memory (PM) 210, a data memory (DM) 212, a DMA circuit 214, and a stream interconnect (SI) 216. In one aspect, each core 208 is capable of executing program code stored in program memory 210. In one aspect, each core 208 may be implemented as a scalar processor, as a vector processor, or as a scalar processor and a vector processor operating in coordination with one another.

In one or more examples, each core 208 is capable of directly accessing the data memory 212 within the same compute tile 152 and the data memory 212 of any other compute tile 152 that is adjacent to the core 208 of the compute tile 152 in the north (up), south (down), west (left), and/or east (right) directions subject to isolation registers being appropriately programmed as discussed below. Core 208 sees data memories 212 within the same tile and in one or more other adjacent compute tiles in a same partition as a unified region of memory (e.g., as a part of the local memory of the core 208). This facilitates data sharing among different compute tiles 152 in data processing array 150. In other examples, core 208 may be directly connected to data memories 212 in other compute tiles 152.

Cores 208 may be directly connected with adjacent cores 208 via core-to-core cascade connections (not shown), subject to isolation registers being appropriately programmed as discussed below. For example, those cores 208 of a same partition may communicate with one another via core-to-core cascade connections. In one aspect, core-to-core cascade connections are unidirectional and direct connections between cores 208. In another aspect, core-to-core cascade connections are bidirectional and direct connections between cores 208. In general, core-to-core cascade connections allow the results stored in an accumulation register of a source core 208 to be provided directly to an input of a target or load core 208. This means that data provided over a cascade connection may be provided among cores directly with less latency since the data does not traverse the stream interconnect 216 and is not written by a first core 208 to data memory 212 to be read by a different core 208.

In an example implementation, compute tiles 152 do not include cache memories. By omitting cache memories, data processing array 150 is capable of achieving predictable, e.g., deterministic, performance. Further, significant processing overhead is avoided since maintaining coherency among cache memories located in different compute tiles 152 is not required. In a further example, cores 208 do not have input interrupts. Thus, cores 208 are capable of operating uninterrupted. Omitting input interrupts to cores 208 also allows data processing array 150 to achieve predictable, e.g., deterministic, performance.

In the example of FIG. 2, each compute tile 152 may be implemented substantially identically to include the same hardware components and/or circuitry. Further, data processing array 150 may include an array of compute tiles formed of any of a variety of processing elements such as digital signal processing engines, cryptographic engines, Forward Error Correction (FEC) engines, or other specialized hardware for performing one or more specialized tasks.

In one or more other examples, compute tiles 152 may not be substantially identical. In this regard, compute tiles 152 may include a heterogeneous mix of compute tiles 152 formed of two or more different types of processing elements. As an illustrative and nonlimiting example, different ones of compute tiles 152 may include processing elements selected from two or more of the following groups: digital signal processing engines, cryptographic engines, Forward Error Correction (FEC) engines, or other specialized hardware.

In the example of FIG. 2, data processing array 150 optionally includes one or more memory tiles 154. Memory tiles 154 include a memory 218 (e.g., a RAM), a DMA circuit 220, and a stream interconnect 216. Each memory tile 154 may read and/or write to the memory 218 of an adjacent memory tile 154 by way of the DMA circuit 220 included in the memory tile 154 subject to isolation registers being appropriately programmed as discussed below. Further, data can be moved to/from the data memory 212 of any compute tile 152 (e.g., by the corresponding DMA 214) from/to the memory 218 of any memory tile 154 (e.g., by the corresponding DMA circuit 220 or the DMA circuit 220 of an adjacent memory tile 154) subject to isolation registers being appropriately programmed as discussed below. In doing so, the data is routed through one or more of stream interconnects 216. Memory tiles 154 are characterized by the lack of computational components such as processors (e.g., cores 208). In the example of FIG. 2, each memory tile 154 may be implemented substantially identically to include the same hardware components and/or circuitry. In one or more other examples, memory tiles 154 may not be substantially identical.

Interface tiles 156 form an array interface 222 for data processing array 150. Array interface 222 operates as an interface that connects tiles of data processing array 150 to other resources of the particular IC in which data processing array 150 is disposed. For example, array interface 222 may communicatively link compute tiles 152 and/or memory tiles 154 with one or more other subsystems of device 104. Such other subsystems may include, but are not limited to, a network-on-chip, a processor system including one or more hardened processor and/or processor cores, programmable logic, memory, and/or other Application Specific IC (ASIC) blocks.

In the example of FIG. 2, array interface 222 includes a plurality of interface tiles 156 organized in a row. Interface tiles 156 can include a stream interconnect 216 and a DMA circuit 224. Interface tiles 156 are connected so that data may be propagated from one interface tile to another bidirectionally. Each interface tile 156 is capable of operating as an interface for the column of tiles directly above and is capable of interfacing such tiles with components and/or subsystems of the IC in which data processing array 150 is disposed.

In one example, array interface 222 may communicatively link tiles of data processing array 150 with a memory that is external to data processing array 150. The memory may be read and/or written by host system 102. The memory may be implemented in the same IC as data processing array 150. That is, the external memory may be an "on-chip" memory whether disposed on the same die as data processing array 150 or on a different die than data processing array 150 but within the same IC package. In another example, the external memory may be external to the IC in which data processing array 150 is implemented. In that case, the external memory may be disposed on the same circuit board as the IC including data processing array 150. For purposes of illustration, the external memory may be implemented as a Double Data Rate RAM (DDR) or a High-Bandwidth Memory (HBM).

Compute tiles 152, memory tiles 154, and interface tiles 156 may be interconnected and communicate over a streaming network formed of streaming interconnects 216. Communication among different tiles is also subject to isolation registers being appropriately programmed as discussed below. For example, only tiles disposed in a same partition 20 may communicate by way of stream interconnects 216.

Figure 3:
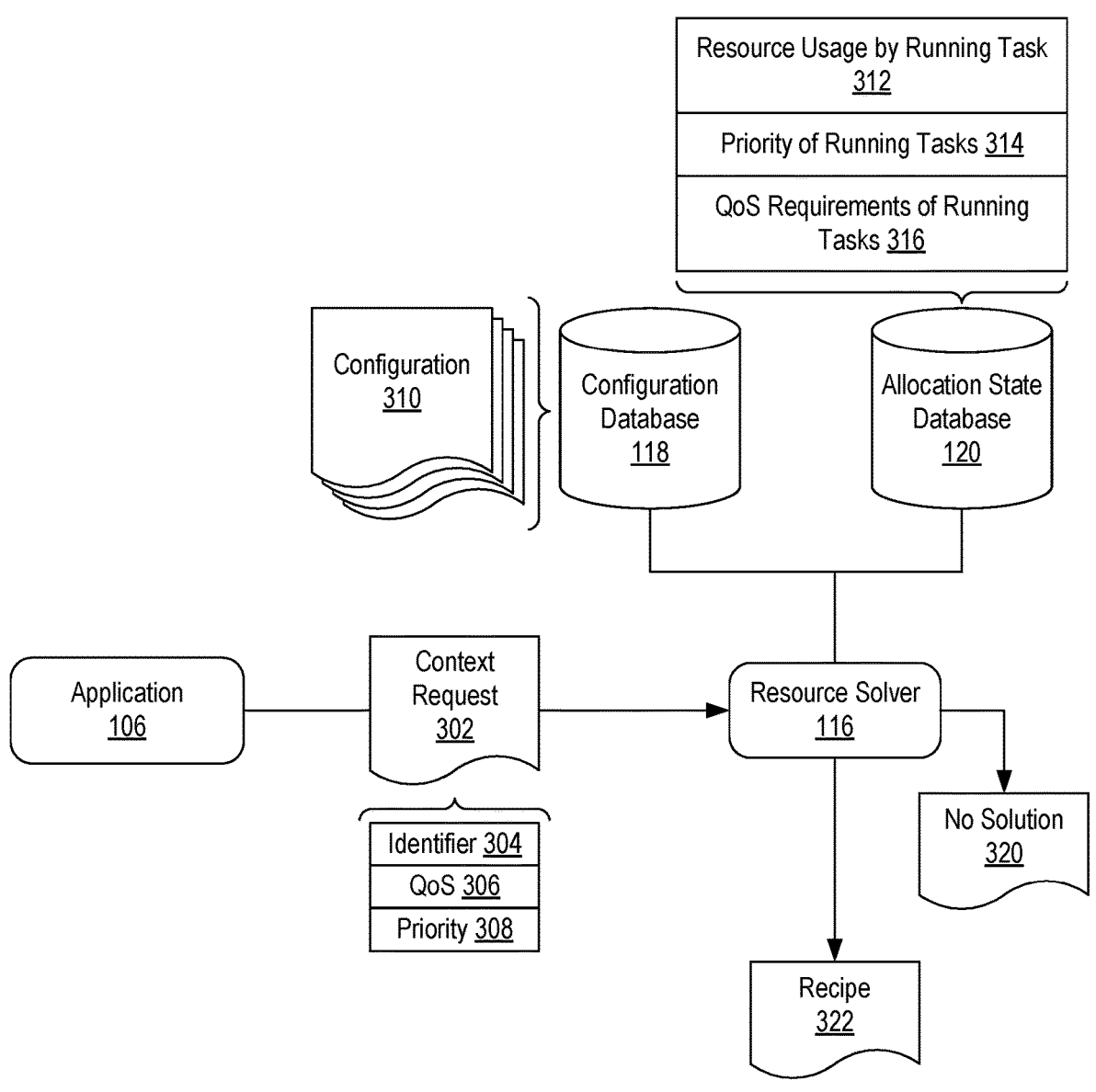
FIG. 3 illustrates certain operational features of the execution environment of the host system.

FIG. 3 illustrates certain operational features of the execution environment of host system 102. In the example of FIG. 3, application 106 submits a context request 302 to resource solver 116. In the example, context request 302 includes an identifier 304, one or more Quality of Service (QoS) requirements 306, and a priority 308.

In the example, identifier 304 specifies a particular task that application 106 is requesting be performed by data processing array 150. As an illustrative and non-limiting example, the task may be Convolutional Neural Network (CNN), Long-Short Term Network (LSTN), Bidirectional Encoder Representations from Transformers (BERT), or other task(s). It should be appreciated that the task may be any task that may be performed by data processing array 150 and/or a portion of data processing array 150.

QoS requirement 306 specifies one or more parameters indicating the QoS that is desired by the requesting application for the particular task to be performed. Examples of parameters of QoS requirement 306 that may be specified may include, but are not limited to, bandwidth (e.g., DMA bandwidth), a number of operations to be performed per second, latency, or the like. Priority 308 may specify a particular level of priority for the task as executed in data processing array 150. Priority 308 may be specified as one of a plurality of different priority levels.

In processing context request 302, resource solver 116 is capable of accessing configuration database 118 and/or allocation state database 120. Configuration database 118 may store a plurality of different configurations 310. Each configuration 310 may include an image (e.g., a binary) including program code that is executable by compute tiles 152 to perform a given task. The binary also may include other configuration data that may be necessary for the tiles to operate. Each configuration 310 also may include metadata describing the image. The metadata may include an identifier for the image and specify capabilities of the image. The capabilities of the image may be specified as one or more QoS parameters that are achieved and/or provided by the image when run, e.g., executed, in data processing array 150.

In one or more examples, the configurations may be included in container files such as XCLBIN files. Each XCLBIN file may include a plurality of different configurations for a given task. For example, in the case where a task is CNN, the container file may include multiple different implementations of a CNN as different binaries with corresponding metadata describing each implementation. It should be appreciated that the particular manner in which different configurations for the same and different tasks are stored is not intended as a limitation.

Allocation state database 120 stores information that specifies the current state of data processing array 150 at any given time. Resource solver 116 keeps allocation state database 120 updated during operation. For example, allocation state database 120 includes information that indicates which resources of data processing array 150 are in use running tasks. For example, resource usage by running task data 312 specifies which tiles (e.g., columns) of data processing array 150 are running an image and indicate such information on a per task basis. Priority of running task data 314 indicates the priority of each image running in data processing array 150. QoS requirements of running tasks data 316 indicates the QoS parameters of each image that is running in data processing array 150.

Within this disclosure, it should be appreciated that each task requested to be performed by data processing array 150 may correspond to a particular configuration selected to perform the task. Accordingly, reference to a running task within data processing array 150 refers to the particular configuration selected to perform the task. Further, it should be appreciated that running a given configuration in data processing array 150 means that the image of the configuration is loaded into a partition of data processing array 150 and run or executed.

Resource solver 116, in response to context request 302, consults configuration database 118 and allocation state database 120 to determine whether a solution exists. That is, resource solver 116 determines whether a configuration 310 exists that is capable of performing the task specified by context request 302 and that also meets the QoS requirements of context request 302. Such configuration 310 also must fit into available column(s) of data processing array 150. If no solution is determined, resource solver 116 is capable of outputting a no solution 320 result. If a solution is determined, resource solver 116 is capable of outputting a recipe 322 specifying the solution. Recipe 322 may be provided to controller 122 for interpretation and execution by firmware 124.

Figure 4A:
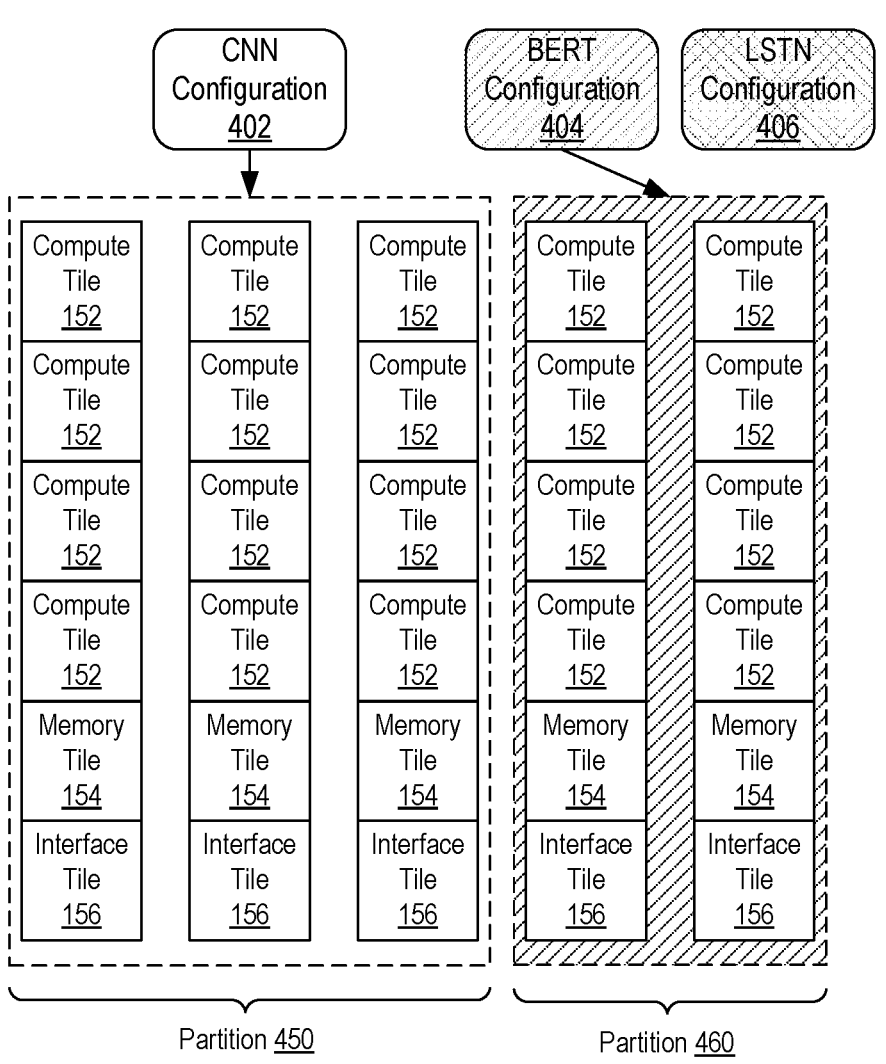
FIGS. 4A, 4B, and 4C, taken collectively, illustrate certain aspects of spatial and temporal sharing in a data processing array.
Figure 4B:
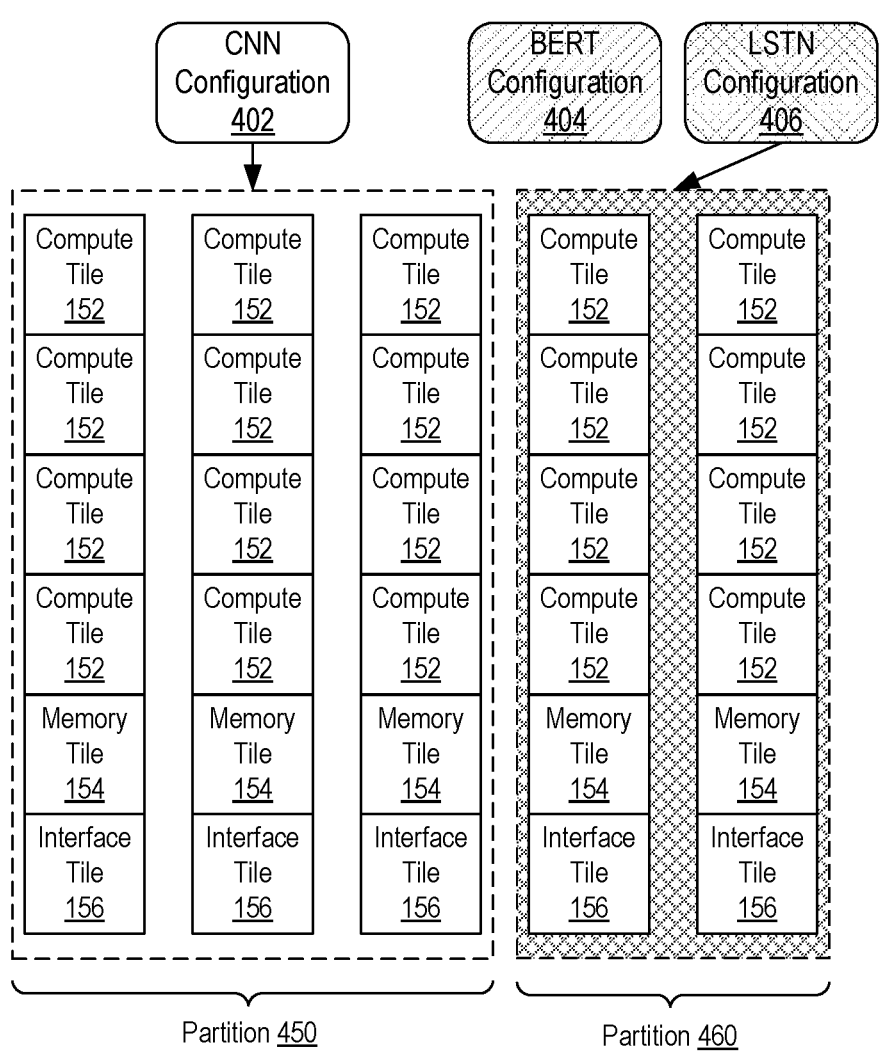
Figure 4C:
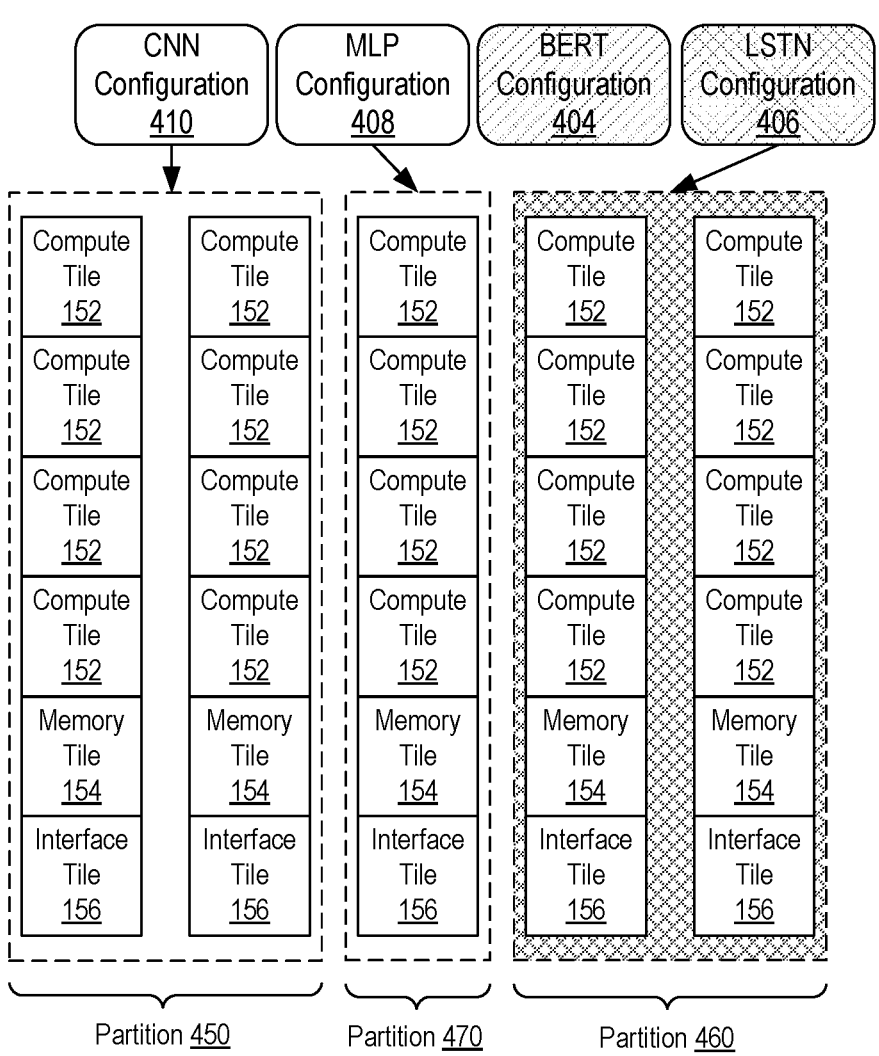

FIGS. 4A, 4B, and 4C, taken collectively, illustrate certain aspects of spatial and temporal sharing in a data processing array. FIGS. 4A, 4B, and 4C illustrate the implementation of different recipes 322 as may be determined by resource solver 116 and provided to controller 122. FIGS. 4A, 4B, and 4C may be collectively referred to as FIG. 4. In the example, a simplified version of data processing array 150 is illustrated including compute tiles 152, memory tiles 154, and interface tiles 156.

In the example of FIG. 4A, resource solver 116 has received context requests from one or more applications for tasks that include a CNN task, a BERT task, and an LSTN task. In the example, the context requests received specify each task requested and QoS requirements for each task. Resource solver 116 has selected a CNN configuration 402, a BERT configuration 404, and an LSTN configuration 406. CNN configuration 402 (e.g., the image thereof), when loaded into data processing array 150 meets the QoS requirements of the requested CNN task. BERT configuration 404, when loaded into data processing array 150, meets the QoS requirements of the requested BERT task. LSTN configuration 406, when loaded into data processing array 150 meets the QoS requirements of the requested LSTN task. Each of the respective configurations meets the QoS requirements when run in data processing array 150 in accordance with the dynamic provisioning determined by resource solver 116 with respect to spatial and/or temporal sharing.

The selected CNN configuration 402 (e.g., the image thereof) requires 3 columns and is implemented in partition 450. As shown, partition 450 is formed of 3 columns. While in some cases data processing array 150 may be organized as a single partition, in implementing spatial and/or temporal sharing, each partition is formed of a number of columns that is less than the total number of columns. That is, data processing array 150 is organized into at least two partitions. Each of the selected BERT configuration 404 and LSTN configuration 406 (e.g., the images thereof), when loaded into data processing array 150 requires 2 columns and is implemented in partition 460, which is formed of 2 columns.

Based on the QoS requirements for each task, resource solver 116 has determined that CNN configuration 402 is to be spatially partitioned. That is, CNN configuration 402 is implemented in partition 450 of data processing array 150. CNN configuration 402 may run concurrently with one or more other configurations of other partition(s). Partition 450 is not used, e.g., temporally shared, to perform another task. No other image is run therein. By comparison, resource solver 116 has determined that BERT configuration 404 and LSTN configuration 406 may be implemented using temporal sharing. That is, BERT configuration 404 may be implemented in partition 460 to process some data, then LSTN configuration 406 is implemented in partition 460 to process some data, then BERT configuration 404 may be implemented again in partition 460 to process additional data, etc., with the two configurations being continually and alternatingly implemented in the same partition in serial fashion over time. In the example of FIG. 4A, BERT configuration 404 is implemented in partition 460, followed by LSTN configuration 406. It should be appreciated that the two configurations may be implemented in partition 460 in a different order.

The example of FIG. 4B illustrates that after a period of time, controller 122 loads LSTN configuration 406 into partition 460. In doing so, CNN configuration 402 continues to run in partition 450. FIGS. 4A and 4B illustrate spatial sharing with respect to partition 450 and CNN configuration 402 and temporal sharing with respect to partition 460, BERT configuration 404, and LSTN configuration 406.

FIG. 4C illustrates another example where, for purposes of illustration, a further context request is received by resource solver 116 for a Multi-Layer Perceptron (MLP) task. Accordingly, resource solver 116 has selected MLP configuration 408. In the example, resource solver 116 generates a recipe indicating that a new partition 470 is to be created. In the example, resource solver 116 has determined that a configuration for performing CNN exists that still meets the QoS requirements of the requested CNN task. Accordingly, resource solver 116 selects CNN configuration 410, which requires only 2 columns. Resource solver 116 has reformed partition 450 from 3 columns to 2 columns and created partition 470. Resource solver 116 has allocated CNN configuration 410 to downsized partition 450 and MLP configuration 408 to partition 470. In this example, the particular MLP configuration 408 selected to perform the MLP task requires only one column corresponding to the size of partition 470.

For example, referring to FIGS. 4A and 4B, an application requests a CNN task with particular QoS requirements. Resource solver 116 determines the task to be performed from the context request is a CNN task and determines the QoS requirement for the task. Resource solver 116 searches configuration database 118, which may include multiple CNN configurations with different QoS parameters, to locate CNN configuration 402 that matches or meets the QoS requirements of the context request.

Resource solver 116 may then determine the number of columns needed by the CNN configuration 402. Resource solver 116 may then determine whether the number of columns needed for CNN configuration 402 are available based on the data contained in allocation state database 120. If, for example, 3 contiguous columns are needed and are available, resource solver 116 allocates the 3 columns to CNN configuration 402 and updates allocation state database 120 to reflect the allocation. The QoS parameters of CNN configuration 402 are added to allocation state database 120 as is the priority of the task.

Subsequently, in response to receiving a context request requesting a BERT task and an LSTM task, resource solver 116 determines configurations for each task that have QoS parameters matching the QoS requirements of the respective BERT and LSTM tasks requested. In this example, the selected configuration for the BERT task and the selected configuration for the LSTM task each require 2 columns. Further, the QoS requirements for each task are such that the configurations may be implemented in a time multiplexed manner (e.g., using temporal sharing). Accordingly, resource solver 116 runs one or more frames using the BERT configuration, then loads the LSTM configuration and runs one or more frames, then switches again to the BERT configuration and so forth. The QoS requirements of the CNN, BERT, and LSTM tasks are still met.

The examples of FIGS. 4A-4C illustrate various operations that may be performed by controller 122 in responding to instructions, e.g., "recipes," from resource solver 116 to perform spatial sharing and/or temporal sharing dynamically over time in response to the context requests received from executing applications in host system 102. The particular adaptations implemented in data processing array 150 at any given time may be dynamically determined and updated as a function of the requested tasks, the QoS requirements of the requested tasks, the priorities of the requested tasks, and tasks/configurations currently running in data processing array 150 with respect to current sharing, QoS requirements, and priorities.

In some cases, for example, a particular configuration performing a particular task may be removed from data processing array 150 and replaced with a different configuration performing a different task that is considered higher priority. In other cases, as illustrated in FIG. 4C, an existing task running in data processing array 150 may be re-allocated to a smaller partition to make room for different task to be run in a newly formed partition presuming that the existing task has a configuration available that fits in the downsized partition and that meets the QoS requirements of the existing task. In other cases, an existing task running in data processing array 150 may be re-allocated to a larger partition presuming that a configuration exists for the existing task that fits in the upsized partition that meets the QoS requirements of the existing task.

FIG. 5 illustrates an example method 500 of dynamic provisioning of a data processing array for spatial and/or temporal sharing. Method 500 may be performed by resource solver 116 as executed by a host processor (e.g., a hardware processor) within computing environment 100 or another similar computing environment. In one or more other example implementations, the host processor may be an embedded processor disposed in the same device (e.g., IC) as data processing array 150. Such an implementation may be used in embedded applications.

In block 502, resource solver 116 receives, from an executing application, context request 302. Context request 302 specifies a requested task to be performed by data processing array 150. As discussed, context request 302 also specifies one or more QoS requirements 306 and a priority 308. Priority 308 may be determined or specified by the application that issued context request 302 and/or set by the operating system of the host processor.

In block 504, resource solver 116 selects, from a plurality of configurations for the data processing array, a selected configuration that conforms with the context request and that is capable of performing the requested task. For example, resource solver 116 may obtain identifier 304 from context request 302. For purposes of illustration, identifier 304 may specify a CNN task. Resource solver 116 is capable of searching configuration database 118 for any configurations 310 having an identifier that matches the identifier from context request 302.

In block 506, resource solver 116 determines whether the selected configuration 310 is implementable in data processing array 150 based, at least in part, on a space requirement of the selected configuration and a current status of data processing array 150. For example, resource solver 116 is capable of determining the amount of space (e.g., columns of tiles of data processing array 150) required to implement the selected configuration 310 from block 504. Resource solver 116 further determines whether the amount of space (e.g., columns) needed by the selected configuration 310 is available within data processing array 150 based on information stored in allocation state database 120.

In block 508, resource solver 116 selectively implements the selected configuration 310 in data processing array 150 based on the determination made in block 506.

It should be appreciated that method 500 is a high-level description of the operations performed by resource solver 116. The operations may be performed with additional sub-steps and/or caveats as described hereinbelow.

FIG. 6 illustrates an example implementation of block 504 of FIG. 5. In block 602, for example, resource solver 116 determines the available configurations that are capable of performing the task specified by the context request as previously described. Multiple different configurations may be suited to perform the specified task In block 604, resource solver 116 determines which of the configurations determined in block 602 meets the QoS requirements for the task (e.g., as determined from the received context request). Resource solver 116 selects the particular configuration to be used to implement the requested task in data processing array 150 from those configurations initially determined in block 602.

In one or more example implementations, resource solver 116 may perform a preliminary review of any received context request to determine whether the priority of the requested task is the same as or greater than any task current running in data processing array 150. In response to determining that the priority of the requested task is the same as or greater than any task currently running in data processing array 150, resource solver 116 may continue with the processing described herein. In one aspect, for example, resource solver 116 may stall a lower priority task running in data processing array 150 in order to implement the requested, higher priority task. In response to determining that the priority of the requested task is less than any task currently running in data processing array 150, resource solver 116 may discard or deny the received context request.

FIG. 7 illustrates an example implementation of block 506 of FIG. 5. FIG. 7 illustrates various example scenarios illustrative of when to utilize spatial sharing and when to utilize temporal sharing.

In block 702, resource solver 116 determines whether space is available for implementing the selected configuration using physical sharing. Resource solver 116, for example, determines whether data processing array 150 has sufficient unused space in which to run the selected configuration.

For example, if a number of columns of data processing array 150 needed by the selected configuration are available to run the selected configuration without performing temporal sharing, resource solver 116 may form the available columns into a partition and allocate the selected configuration to the newly formed partition. In response to determining that space is available for implementing the selected configuration using physical sharing, the method can continue to block 712 to generate a recipe specifying such operations. In response to determining that space is not available for implementing the selected configuration using physical sharing (e.g., at least without taking further measures as described below), the method continues to block 704.

In block 704, resource solver 116 determines whether to use temporal sharing (e.g., sharing) of an existing partition to implement the requested task. For example, if an existing partition is running a configuration and the partition can be temporally shared with the selected configuration while meeting the QoS requirements of both configurations (e.g., tasks), resource solver 116 may choose to implement the configuration in the partition using temporal sharing. In response to determining that temporal sharing can be used, the method can continue to block 712 to generate a recipe specifying such operations. In response to determining that temporal sharing cannot be used, the method continues to block 704.

In block 706, resource solver 116 determines whether to resize one or more existing partitions in data processing array 150 to make room for the requested task. For example, if one or more tasks running in data processing array 150 have configurations that meet the QoS requirements for the respective tasks but that require fewer tiles (e.g., columns) and can be run in a smaller partition, resource solver 116 may resize one or more existing partitions to make space to run the requested task. In that case, resource solver 116 will generate a recipe that specifies alternative configurations for one or more tasks running in data processing array 150, resize the one or more corresponding partitions for the task(s), allocate the alternative configurations to the resized partition(s), create a new partition for the requested task using the newly freed column(s), and allocate the selected configuration to the newly created partition. In response to determining that one or more partitions are to be resized, the method can continue to block 712 to generate a recipe specifying such operations. In response to determining that partition(s) are not to be resized, the method continues to block 704.

As an illustrative and non-limiting example, for an existing configuration running in data processing array 150 that performs a particular task, resource solver 116 is capable of selecting a different configuration that performs the particular task and that requires less space in data processing array 150 than the existing configuration. Resource solver 116 runs the different configuration in data processing array 150 and runs the selected configuration in a portion of data processing array 150 that becomes available from running the different configuration.

In block 708, resource solver 116 determines whether to remove one or more lower priority tasks from data processing array 150 to make room for the requested task. For example, resource solver 116 may determine the priority of each of the tasks currently running in data processing array 150. In response to determining that one or more tasks running in data processing array 150 are of lower priority than the requested task, resource solver 116 may determine that such tasks may be terminated and removed from data processing array 150 to make room for running the selected configuration corresponding to the requested task. In response to determining that one or more lower priority tasks are to be removed, the method can continue to block 712 to generate a recipe specifying such operations. In response to determining that one or more lower priority tasks are not to be removed, the method continues to block 710.

As an illustrative and non-limiting example, in response to determining that data processing array 150 does not have sufficient space to run a selected configuration, resource solver 116 is capable of terminating operation of an existing configuration running in a selected partition of data processing array 150 and running the selected configuration in the selected partition of the data processing array. In one or more aspects, the selected configuration has a higher priority than the existing configuration. In one or more other aspects, the existing configuration is moved to a different partition of the data processing array and run in the different partition.

In block 710, resource solver 116 determines whether a solution has been determined. In response to determining a solution, the method can continue to block 712. In the case where resource solver 116 is unable to determine a solution, the method can continue to block 714 where resource solver 116 outputs result indicating that no solution is available.

In block 712, resource solver 116 generates a recipe that includes instructions for controller 122. Resource solver 116 may output the generated recipe to controller 122 for execution and implementation of the various operations included in the recipe to effectuate the dynamic provisioning of data processing array 150 described. For example, the recipe may include any instructions necessary to load new configurations, unload running configurations, resize existing partitions, and the like.

As part of block 712, resource solver 116 may also update allocation state database 120 to reflect current status information for data processing array 150 based on the generated recipe. In this manner, resource solver 116 is capable of tracking the current status of data processing array 150 using allocation state database 120. The current status may indicate each configuration running in data processing array 150 and a partition of data processing array 150 in which each configuration is running.

As discussed, the recipe generated by resource solver 116 may specify instructions that are executed by controller 122. These instructions may specify operations such as creating partitions and deleting partitions. Resizing a partition may be considered deleting an existing partition and creating a new partition that is larger or smaller in size. In one aspect, partition creation may be considered a distinct operation or set of operations than running a configuration in the partition. In the case of partition creation, controller 122, in executing firmware 124, may program isolation registers in data processing array 150 to block data transfers in particular directions. In the examples described herein, as partitions are formed of columns, the isolation registers prevent communication in the west (left) and east (right) directions. An image may be loaded on top of, or after, creating the partition. For example, in creating partition 450 of FIG. 4A, the middle column of tiles is unable to communicate with the next column of tiles to the right that is part of partition 460. Only tiles in a same partition may communicate and/or share data.

The creation of partitions allows images to run to perform tasks in a secure manner where each partition is independent of each other partition. No data leakage occurs between partitions. In cases where partitions are temporally shared between two or more configurations, processes may be implemented to prevent data leakage. In the example of FIG. 4, where BERT configuration 404 and LSTM configuration 406 are implemented using temporal sharing in partition 460, resource solver 116 may provide a recipe to controller 122 that, in specifying temporal sharing, causes controller 122 to clear memories of tiles in partition 460 prior to loading a new configuration therein. More particularly, any data memories (212, 218, and/or DMA circuits 214, 220, and 224) may be cleared prior to loading a different configuration. Similarly, program memories 210 may be cleared.

In some cases, a same configuration may be used to perform tasks for different applications. That is, the same configuration may perform different workloads. As an illustrative and non-limiting example, CNN configuration 402 may be implemented and process a first workload for application 106 and then process a second and different workload for application 108. In that case, controller 122, operating under instructions from resource solver 116, may clear the data memories of the partition, but not the program memories of the partition. In addition, controller 112, operating under instructions from resource resolver 116, may clear DMA configurations of DMAs. Such is the case as the same configuration is used to process the first and second workloads. Only the data memories 212, 218 and configurations for DMAs 220, 214, and 224 need be cleared to prevent data leakage. By not clearing the program memories 210, the partition may begin the next workload in less time as an image (in this case the same image) need not be reloaded into program memories 210 of the partition.

The example of FIG. 7 is provided for purposes of illustration only. It should be appreciated that any of a variety of rules for dynamically provisioning portions of data processing array 150 may be specified and implemented. Further, the particular operations of FIG. 7 may be performed in a different order than described.

Figure 8:
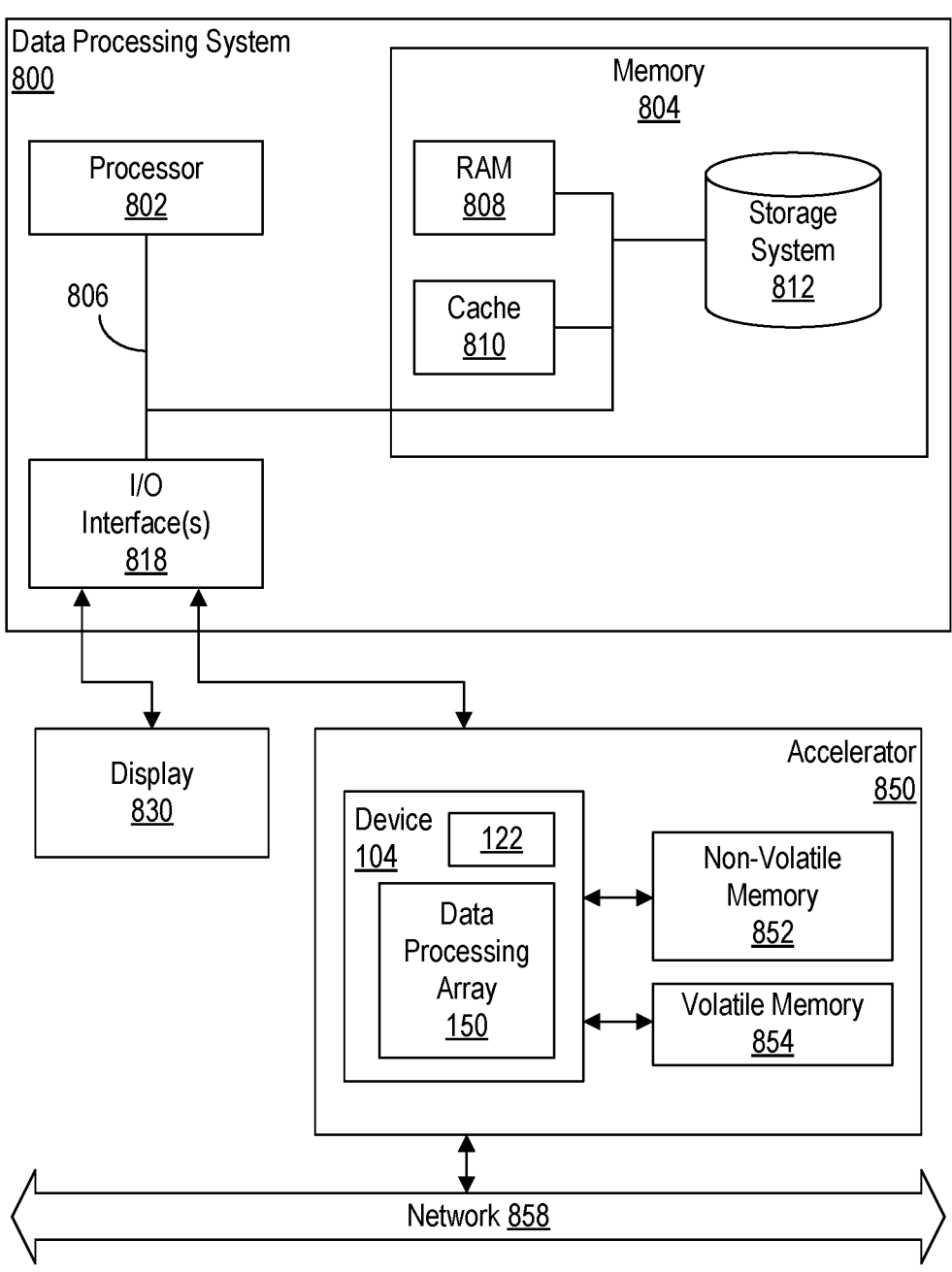
FIG. 8 illustrates an example hardware implementation of the computing environment of FIG. 1.

FIG. 8 illustrates an example hardware implementation of computing environment 100 of FIG. 1. As shown, computing environment 100 includes a data processing system 800. As defined herein, the term "data processing system" means one or more hardware systems configured to process data, each hardware system including at least one processor and memory, wherein the processor is programmed with computer-readable instructions that, upon execution, initiate operations. Data processing system 800 can include a processor 802, a memory 804, and a bus 806 that couples various system components including memory 804 to processor 802. Data processing system 800 is an example implementation of host system 102.

Processor 802 may be implemented as one or more processors. In an example, processor 802 is implemented as a CPU. Processor 802 may be implemented as one or more circuits (e.g., as hardware) capable of carrying out instructions contained in program code. The circuit may be an integrated circuit or embedded in an integrated circuit.

Processor 802 may be implemented using a complex instruction set computer architecture (CISC), a reduced instruction set computer architecture (RISC), a vector processing architecture, or other known architectures. Example processors include, but are not limited to, processors having an x86 type of architecture (IA-32, IA-64, etc.), Power Architecture, ARM processors, and the like.

Bus 806 represents one or more of any of a variety of communication bus structures. By way of example, and not limitation, bus 806 may be implemented as a Peripheral Component Interconnect Express (PCIe) bus. Data processing system 800 typically includes a variety of computer system readable media. Such media may include computer-readable volatile and non-volatile media and computer-readable removable and non-removable media.

Memory 804 can include computer-readable media in the form of volatile memory, such as random-access memory (RAM) 808 and/or cache memory 810. Data processing system 800 also can include other removable/non-removable, volatile/non-volatile computer storage media. By way of example, storage system 812 can be provided for reading from and writing to a non-removable, non-volatile magnetic and/or solid-state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 806 by one or more data media interfaces. Memory 804 is an example of at least one computer program product.

Memory 804 is capable of storing computer-readable program instructions that are executable by processor 802. For example, the computer-readable program instructions can include an operating system, one or more application programs, other program code, and program data. In the example, data processing system 800, e.g., processor 802, is capable of executing the software architecture of host system 102 illustrated in FIG. 1. Processor 802, in executing the computer-readable program instructions, is capable of performing the various operations described herein that are attributable to a computer and, for example, to a host processor. It should be appreciated that data items used, generated, and/or operated upon by data processing system 800 are functional data structures that impart functionality when employed by data processing system 800.

As defined within this disclosure, the term "data structure" means a physical implementation of a data model's organization of data within a physical memory. As such, a data structure is formed of specific electrical or magnetic structural elements in a memory. A data structure imposes physical organization on the data stored in the memory as used by an application program executed using a processor.

Data processing system 800 may include one or more Input/Output (I/O) interfaces 818 communicatively linked to bus 806. I/O interface(s) 818 allow data processing system 800 to communicate with one or more external devices. Examples of I/O interfaces 818 may include, but are not limited to, network cards, modems, network adapters, hardware controllers, etc. Examples of external devices include devices that allow a user to interact with data processing system 800 (e.g., a display 830, a keyboard, and/or a pointing device) and/or other devices such as accelerator 850. In the example, via I/O interface(s) 818, data processing system 800 may convey data (e.g., instructions as may be specified as recipes and/or other data to be operated on)

to accelerator 850. In the example, data processing system 800 may be communicatively linked to accelerator 850 via a communication bus.

Data processing system 800 is only one example implementation. Data processing system 800 can be practiced as a standalone device (e.g., as a user computing device or a server, as a bare metal server), in a cluster (e.g., two or more interconnected computers), or in a distributed cloud computing environment (e.g., as a cloud computing node) where tasks are performed by remote processing devices that are linked through a communications network. In a distributed cloud computing environment, program modules may be located in both local and remote computer system storage media including memory storage devices.

In an example implementation, data processing system 800 and accelerator 850 communicate over a communication channel. In one aspect, I/O interface 818 may be implemented as a PCIe adapter and the communication channel may be a PCIe communication channel. Accelerator 850 may be implemented as a circuit board that couples to data processing system 800. Accelerator 850 may, for example, be inserted into a card slot, e.g., an available bus and/or PCIe slot, of data processing system 800.

Accelerator 850 may include device 104. Device 104, as noted, includes controller 122 and data processing array 150. Accelerator 850 also may include a volatile memory 854 coupled to device 104 and a non-volatile memory 852 also coupled to device 104. Volatile memory 852 may be implemented as a RAM.

Optionally, in some examples, accelerator 850 is configured to communicate over one or more networks such as network 858. Network 858 may be a local area network (LAN) or a wide area network (WAN). For example, network 858 may be an Ethernet network. In another example, network 858 may be a public network such as the Internet.

The example of FIG. 8 is provided for purposes of illustration and not limitation. As noted, in one or more other example implementations, a host processor may be embedded within device 104 such that the entire architecture illustrated in FIG. 1 is included within device 104.

The terminology used herein is for the purpose of describing particular embodiments only and is not intended to be limiting. Notwithstanding, several definitions that apply throughout this document are expressly defined as follows.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention.

As defined herein, the term "computer-readable storage medium" means a storage medium that contains or stores program instructions for use by or in connection with an instruction execution system, apparatus, or device. As defined herein, a "computer-readable storage medium" is not a transitory, propagating signal per se. The various forms of memory, as described herein, are examples of computer-readable storage media. A non-exhaustive list of examples of computer-readable storage media include an electronic storage device, a magnetic storage device, an optical storage device, an electromagnetic storage device, a semiconductor storage device, or any suitable combination of the foregoing. A non-exhaustive list of more specific examples of a computer-readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the terms "individual" and "user" each refer to a human being.

As defined herein, the term "hardware processor" means at least one hardware circuit. The hardware circuit may be configured to carry out instructions contained in program code. The hardware circuit may be an integrated circuit. Examples of a hardware processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the terms "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc., may be used herein to describe various elements. These elements should not be limited by these terms, as these terms are only used to distinguish one element from another unless stated otherwise or the context clearly indicates otherwise.

A computer program product may include a computer-readable storage medium (or media) having computer-readable program instructions thereon for causing a processor to carry out aspects of the inventive arrangements described herein. Within this disclosure, the term "program code" is used interchangeably with the term "program instructions." Computer-readable program instructions described herein may be downloaded to respective computing/processing devices from a computer-readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer-readable program instructions may include state-setting data. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer-readable program instructions by utilizing state information of the computer-readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer-readable program instructions, e.g., program code.

These computer-readable program instructions may be provided to a processor of a computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the operations specified in the flowchart and/or block diagram block or blocks.

The computer-readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:

receiving, from an executing application, a context request, wherein the context request specifies a requested task to be performed by a data processing array;

selecting, from a plurality of configurations for the data processing array, a selected configuration that conforms with the context request and that is capable of performing the requested task;

determining whether the selected configuration is implementable in the data processing array by, at least in part, determining whether the data processing array has sufficient unused space in which to run the selected configuration based on a space requirement of the selected configuration and a current status of the data processing array; and in response to determining that the data processing array does not have sufficient space to run the selected configuration, for an existing configuration running in the data processing array that performs a particular task, selecting a different configuration that performs the particular task and that requires less space in the data processing array than the existing configuration, running the different configuration in the data processing array, and running the selected configuration in a portion of the data processing array that includes a region that becomes available from running the different configuration.

2. The method of claim 1, further comprising:

tracking the current status of the data processing array, wherein the current status indicates each configuration running in the data processing array and a partition of the data processing array in which each configuration is running.

3. The method of claim 1, wherein:

the context request specifies a Quality of Service (QoS) requirement for the requested task; and the selecting selects a configuration capable of performing the requested task that meets the QoS requirement of the context request.

4. The method of claim 1, further comprising:

determining whether to implement the selected configuration using temporal sharing or location sharing.

5. The method of claim 1, further comprising:

in response to determining that the data processing array does not have sufficient space to run a further selected configuration, terminating operation of a different existing configuration running in a selected partition of the data processing array, and running the further selected configuration in the selected partition of the data processing array.

6. The method of claim 5, wherein the further selected configuration has a higher priority than the existing configuration.

7. The method of claim 5, wherein the different existing configuration is moved to a different partition of the data processing array and run in the different partition.

8. The method of claim 1, further comprising:

for a partition implementing a configuration that processes independent workloads, performing a first workload, clearing data memories of the partition, and performing a second and different workload.

9. A system, comprising:

one or more hardware processors configured to initiate operations including:

receiving, from an executing application, a context request, wherein the context request specifies a requested task to be performed by a data processing array;

selecting, from a plurality of configurations for the data processing array, a selected configuration that conforms with the context request and that is capable of performing the requested task;

determining whether the selected configuration is implementable in the data processing array by, at least in part, determining whether the data processing array has sufficient unused space in which to run the selected configuration based on a space requirement of the selected configuration and a current status of the data processing array; and in response to determining that the data processing array does not have sufficient space to run the selected configuration, for an existing configuration running in the data processing array that performs a particular task, selecting a different configuration that performs the particular task and that requires less space in the data processing array than the existing configuration, running the different configuration in the data processing array, and running the selected configuration in a portion of the data processing array that includes a region that becomes available from running the different configuration.

10. The system of claim 9, wherein the one or more hardware processors are configured to initiate operations further comprising:

tracking the current status of the data processing array, wherein the current status indicates each configuration running in the data processing array and a partition of the data processing array in which each configuration is running.

11. The system of claim 9, wherein:

the context request specifies a Quality of Service (QoS) requirement for the requested task; and the selecting selects a configuration capable of performing the requested task that meets the QoS requirement of the context request.

12. The system of claim 9, wherein the one or more hardware processors are configured to initiate operations further comprising:

determining whether to implement the selected configuration using temporal sharing or location sharing.

13. The system of claim 9, wherein the one or more hardware processors are configured to initiate operations further comprising:

in response to determining that the data processing array does not have sufficient space to run a further selected configuration, terminating operation of a different existing configuration running in a selected partition of the data processing array, and running the further selected configuration in the selected partition of the data processing array.

14. The system of claim 13, wherein the further selected configuration has a higher priority than the existing configuration.

15. The system of claim 13, wherein the different existing configuration is moved to a different partition of the data processing array and run in the different partition.

16. The system of claim 9, wherein the one or more hardware processors are configured to initiate operations further comprising:

for a partition implementing a configuration that processes independent workloads, performing a first workload, clearing data memories of the partition, and performing a second and different workload.

17. A computer program product comprising one or more computer readable storage mediums having program instructions embodied therewith, the program instructions executable by computer hardware to cause the computer hardware to initiate executable operations comprising:

receiving, from an executing application, a context request, wherein the context request specifies a requested task to be performed by a data processing array;

selecting, from a plurality of configurations for the data processing array, a selected configuration that conforms with the context request and that is capable of performing the requested task;

determining whether the selected configuration is implementable in the data processing array by, at least in part, determining whether the data processing array has sufficient unused space in which to run the selected configuration based on a space requirement of the selected configuration and a current status of the data processing array; and in response to determining that the data processing array does not have sufficient space to run the selected configuration, for an existing configuration running in the data processing array that performs a particular task, selecting a different configuration that performs the particular task and that requires less space in the data processing array than the existing configuration, running the different configuration in the data processing array, and running the selected configuration in a portion of the data processing array that includes a region that becomes available from running the different configuration.

* * * * *